July 22, 1969    ERNST-AUGUST BIELEFELDT    3,456,905
AIRCRAFT PROVIDED WITH MEANS FOR THE COMPENSATION
OF THE SHIFT OF THE AERODYNAMIC CENTER
Filed Feb. 7, 1967

*Inventor:*
ERNST-AUGUST BIELEFELDT

3,456,905
AIRCRAFT PROVIDED WITH MEANS FOR THE COMPENSATION OF THE SHIFT OF THE AERODYNAMIC CENTER
Ernst-August Bielefeldt, Hamburg, Germany, assignor to Hamburger Flugzeugbau GmbH, Hamburg-Finkenwerder, Germany
Filed Feb. 7, 1967, Ser. No. 614,435
Claims priority, application Germany, Feb. 10, 1966, H 58,516
Int. Cl. B64c 9/00, 3/44
U.S. Cl. 244—43                                                     4 Claims

ABSTRACT OF THE DISCLOSURE

Aircraft, particularly supersonic airplanes, provided, in front of the wing, with rotatable, pivotable or slidable lift surfaces. The latter consist of a plurality of interconnected partial surfaces which may be extended or retracted. These partial surfaces can move about axes which are substantially parallel to the vertical axis of the aircraft, substantially parallel to the lateral axis of the craft, or in the plane of its wing contour.

---

In order to compensate for the shift of the aerodynamic center of airplanes, and particularly of supersonic aircraft, the same are provided, in front of the wing, with rotatable, pivotable or slidable partial surfaces. The shift of the areodynamic center is liable to occur upon passing through the Mach range until cruising speed has been attained. With such an aircraft, a compensation of the aerodynamic center shift is attained upon passing through the Mach ranges or upon changing the Mach number of the craft which substantially is equally effective at all Mach numbers. In this manner, the aerodynamic center position can be controlled for every Mach number range and for every wing shape while simultaneously largely avoiding additional trim resistance. A controllable additional lift is generated which counteracts the shifting of the aerodynamic center, whereby the lift surface, by suitable construction and control of its rotation or turning action, compensates for the shift of the aerodynamic center within the entire flight range.

It is the object of the invention to improve aircraft provided with such means. This improvement is attained by forming the lift surface of a plurality of partial surfaces which are movably connected by suitable linkages. Thereby, less space is required for housing the retracted lift surface in the fuselage, i.e., the usable working space therein is increased. Moreover, the multisectional lift surface permits a change in the wing shape near the nose by partial retraction. A further advantage of the invention consists in the easy retraction and extension of the partial surfaces.

Preferred embodiments of the invention will now be shown with reference to the accompanying drawings.

Figure 1:
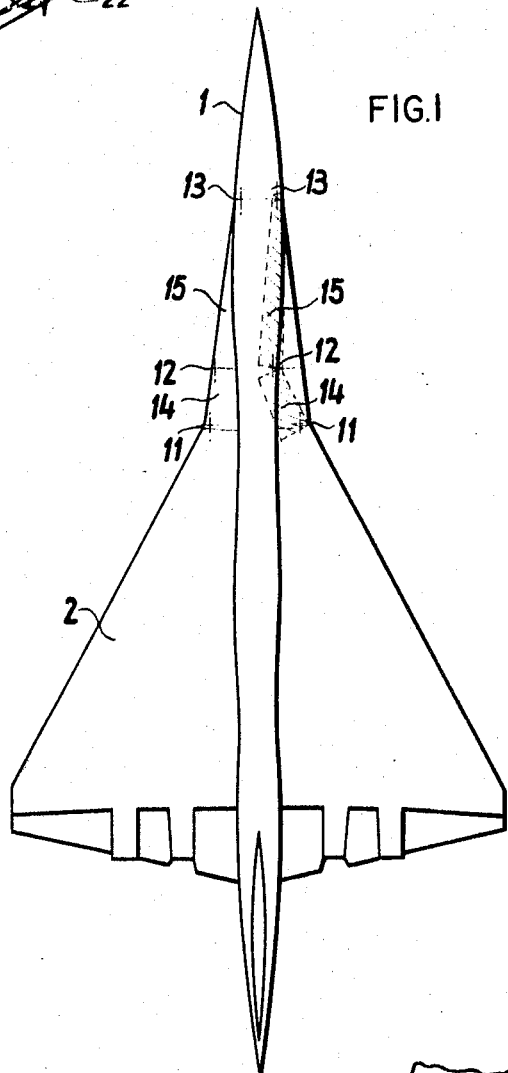
FIG. 1 is a schematic top plan view of a supersonic delta wing aircraft wherein the partial surfaces move about an axis substantially parallel to the vertical axis of the craft.

Referring now to these drawings, in FIG. 1, a lift surface is disposed at the front edge of each immovable sweepback delta wing 2 of the aircraft 1. This lift surface is composed of two interlinked partial surfaces 14 and 15 that are pivotable about axes 11, 12, 13, substantially parallel to the vertical axis of the craft. The partial surfaces 14, 15, are movable relative to the remainder of the wing 2 and relative to each other, being pivoted or otherwise connected by suitable linkages (not shown) to each other. The left side of the drawing illustrates the partial surfaces 14, 15 in extended position, while the right side shows, by the hatched areas, in the retracted position of the lift surface. The shift of the aerodynamic center, when changing the Mach number, is compensated for by suitable retraction or extension of the surfaces 14, 15.

Figure 2:
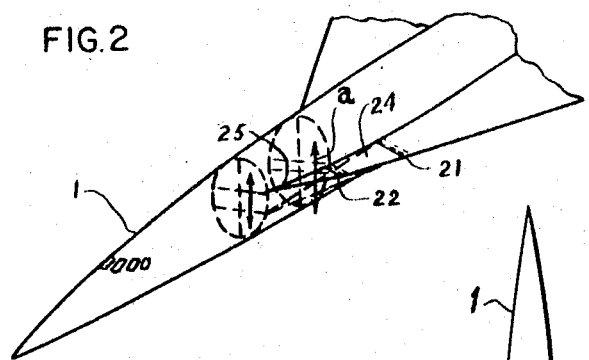
FIG. 2 is a schematic of a delta wing craft wherein the partial surfaces move about an axis parallel to the lateral axis of the craft.

In FIG. 2, an embodiment is illustrated wherein the partial surfaces 24, 25 move about axes 21, 22 which are parallel to the transverse axis of the craft. The movements of these partial surfaces are indicated by arrow a.

Figure 3:
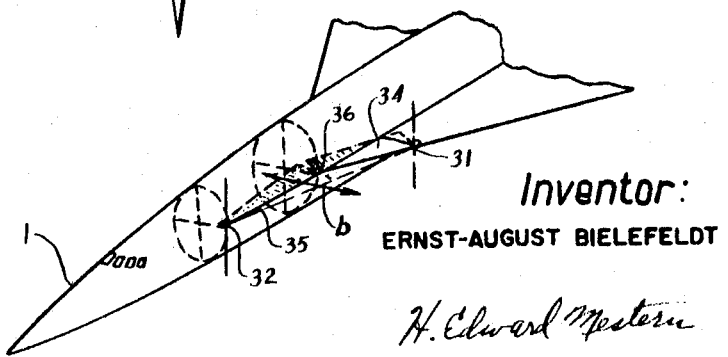
FIG. 3 is a schematic of a delta wing aircraft wherein the partial surfaces move in the plane of the wing contour.

The embodiment according to FIG. 3 shows two partial surfaces 34, 35, movable in the plane of the wing contour, in the directions of arrow b. Partial surface 34 pivotably hinges on axis 31 which is parallel to the vertical axis of the airplane, whereas partial surface 35 swings about an axis 32, parallel to the vertical axis of the craft. The partial surfaces are interconnected by a pivot connection 36.

I wish it to be understood that I do not desire to be limited to the exact details of construction shown and described, for obvious modifications will occur to a person skilled in the art.

I claim:

1. In a supersonic aircraft having immovable sweepback main supporting wings, the improvement of compensating for the shift in the aerodynamic center upon changes in the Mach number, which comprises a movable portion disposed in front of said immovable wings in abutting relationship therewith and forming a lift surface composed of at least two partial surfaces pivoted to each other and movable relative to said immovable wings, thereby being capable of extension and retraction.

2. The aircraft as defined in claim 1, wherein said partial surfaces move about an axis which is substantially parallel to the vertical axis of the craft.

3. The aircraft as defined in claim 1, wherein said partial surfaces move about an axis which is substantially parallel to the transverse axis of said craft.

4. The aircraft as defined in claim 1, wherein said partial surfaces move in the plane of the immovable wings contour.

References Cited

UNITED STATES PATENTS

| 2,743,888 | 5/1956 | Lippisch | 244—43 |
| 3,104,082 | 9/1963 | Polhamus | 244—46 |
| 2,915,261 | 12/1959 | Wallis | 244—46 |

FOREIGN PATENTS

| 162,595 | 4/1955 | Australia. |
| 1,388,089 | 12/1964 | France. |

MILTON BUCHLER, Primary Examiner
RICHARD A. DORNON, Assistant Examiner

U.S. Cl. X.R.

259—179; 241—110, 102, 65